(12) United States Patent
Liu

(10) Patent No.: US 9,453,656 B2
(45) Date of Patent: Sep. 27, 2016

(54) FAN COIL UNIT/CRAC OPTIMIZER SYSTEM

(71) Applicant: Mingsheng Liu, Omaha, NE (US)

(72) Inventor: Mingsheng Liu, Omaha, NE (US)

( * ) Notice: Subject to any disclaimer, the term of this patent is extended or adjusted under 35 U.S.C. 154(b) by 144 days.

(21) Appl. No.: 14/190,015

(22) Filed: Feb. 25, 2014

(65) Prior Publication Data
US 2014/0242899 A1    Aug. 28, 2014

Related U.S. Application Data

(60) Provisional application No. 61/769,510, filed on Feb. 26, 2013.

(51) Int. Cl.
| F24F 7/00 | (2006.01) |
| F24F 11/00 | (2006.01) |
| F24F 13/06 | (2006.01) |
| F24F 13/08 | (2006.01) |
| F24F 11/053 | (2006.01) |
| F24F 1/00 | (2011.01) |

(52) U.S. Cl.
CPC ............ *F24F 11/053* (2013.01); *F24F 1/0007* (2013.01); *F24F 11/0012* (2013.01); *F24F 11/0079* (2013.01); *Y02B 30/746* (2013.01)

(58) Field of Classification Search
CPC ............... F24F 11/053; F24F 11/0012; F24F 11/0079; F24F 1/0007; Y02B 30/746
USPC .......................... 700/276, 278; 454/258, 184
See application file for complete search history.

(56) References Cited

U.S. PATENT DOCUMENTS

| 5,613,369 | A | * | 3/1997 | Sato | ........................ F24F 11/006 236/78 D |
| 7,010,392 | B2 | | 3/2006 | Bash et al. | |
| 8,019,477 | B2 | | 9/2011 | Bash et al. | |
| 2012/0016526 | A1 | * | 1/2012 | Burton | ................... F24F 11/008 700/278 |

* cited by examiner

*Primary Examiner* — Kristen Matter

(57) ABSTRACT

A system and method for modulating the speed of a fan over a period of time to maintain the space temperature of a room. The system and method involves the use of a CRAC unit or a fan coil unit. In an embodiment, the system is comprised of said CRAC or fan coil unit, a variable frequency drive, fan motor, fan, room temperature sensor, and supply air temperature sensor. Based on the collected room and supply air temperature values, a novel control sequence determines how to best modulate the speed of the fan motor over a period of time. Using this system and control method, the space temperature can be controlled at the desired temperature.

1 Claim, 2 Drawing Sheets

FAN COIL UNIT/CRAC OPTIMIZER SYSTEM

CROSS-REFERENCE TO RELATED APPLICATIONS

This application claims the benefit of U.S. Provisional Patent Application Ser. No. 61/769510 filed on Feb. 26, 2013

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

TECHNICAL FIELD

The disclosed embodiments generally relates to chilled water-based fan coils, air handling units, and computer room air-conditioning units and more particularly to a system and method for optimizing chilled water-based fan coils and computer room air-conditioning units to maintain comfortable room air temperatures.

DESCRIPTION OF THE RELATED ART

Optimizing room climate control is important for ensuring the comfort of building occupants and the efficiency of building systems and equipment. One way that the humidity, temperature, and air distribution in a network room, data center, or other facility equipped with computer systems (but not limited to the previously mentioned locales) is monitored and maintained is through the use of one or more computer room air conditioning (CRAC) unit(s). Fan coil units also control the room climate by removing heat from the air of a zone.

Chilled water-based fan coils and computer room air-conditioning units often use a constant speed fan. In the prior art, these fans typically have small motors which makes it difficult to apply variable flow. Retrofit costs can be especially high if a new thermostat and extensive wiring is involved.

Fan coil units in the prior art generally use a thermostat to control the fan on/off, control valve on/off, or to modulate the valve position to maintain the room temperature. The fan can have an auto mode, an off mode, and an on mode. In auto mode, the fan shuts off when the room temperature is satisfied. In the on mode, the fan runs at all times. The control valve can be either a two-position or a modulation valve. In the off mode the fan is not in operation.

If a two-position control valve is employed the valve will open when the thermostat calls for cooling or heating and in all other cases remain closed. On the other hand, if a modulation valve is used it will modulate to maintain the room temperature set point. The direct action mode is used during cooling while the inverse action mode is used for heating.

A variable frequency drive VFD can be added to the fan coil to modulate the fan speed and potentially reduce the fan energy consumption, fan noise, and cold air draft (when the control valve is malfunctioning).

However, the commonly known method in the prior art to do this entails significant rewiring and the installation costs are high. In a prior art method, a VFD installed on the supply air fan modulates the fan speed to control the room temperature. The supply air temperature is maintained by the existing control valve. In the art, a supply air thermostat often needs to be installed to modulate the control valve.

In prior art CRAC (computer room air-conditioning) units with chilled water coils, the fan runs constant at all times when the unit is started. A chilled water valve is modulated to maintain the room temperature at normal conditions. If the room relative humidity is too high, the chilled water valve is modulated to maintain the room relative humidity at an appropriate level. A reheat device is also used to maintain the room temperature. If the room relative humidity is too low, a humidifier adds steam to the zone. The fan power and cooling energy consumption is significantly reduced by installing a VFD on the supply air fan.

In order to lower installation costs and maintain optimal room air temperatures, a novel chilled-water based fan coil unit/CRAC optimizer system is described in this application. The proposed embodiment differs from the prior art in that a supply air temperature sensor is added to the supply air duct. This temperature sensor is controlled by a VFD (variable frequency drive). A control valve still modulates to maintain the room temperature. This optimal configuration is supported by a novel control method that has a variety of advantages over the prior art as discussed below.

The proposed embodiment improves building energy performance and comfort levels. The existing controller remains unchanged and operates as designed while the VFD is controlled to maintain the pre-selected supply air temperature. The proposed retrofit is also advantageous over the prior art in that it requires very minimal labor to implement.

It is therefore one aspect of an embodiment to ensure that fan coil units FCU and CRAC units continuously operate under lack of capacity conditions (conditions in which the needed capacity cannot be provided).

It is a further aspect of an embodiment to increase the system efficiency of CRAC units. (During the dehumidification process the fan runs at a low speed, resulting in less chilled water energy consumption).

SUMMARY OF THE INVENTION

The following summary of the invention is provided to facilitate an understanding of some of the innovative features unique to an embodiment of the present invention and is not intended to be a full description. A full appreciation of the various aspects of the invention can be gained by taking the entire specification, claims, drawings, and abstract as a whole.

In an embodiment, a fan coil unit/CRAC unit optimizer system for a heating,ventilation, and air-conditioning HVAC fan coil and/or computer room air conditioning units is provided. The fan coil unit/CRAC optimizer system is comprised of a customizable and programmable variable frequency drive (VFD), a supply air temperature sensor, and a fan motor or fan blower.

An embodiment may include a method of adjusting the fan/blower speed between minimum and maximum values to maintain the room temperature at the set point. The method comprises collecting room temperature information and supply air temperature information and utilizing this information to determine how a space can be temperature controlled, or, in other words, to determine whether heating or cooling is needed to maintain the space temperature at a desired temperature. A control sequence determines the amount of time needed to heat or cool the space in order to maintain the desired room temperature. Based on room temperature information collected by the room temperature sensor and supply air temperature information collected by the supply air temperature sensor, an appropriate embedded proportional-integral-derivative control loop is selected to modulate the speed of the fan and thus control the room at an appropriate temperature. As an example, the fan speed may be increased if the fan coil unit or CRAC unit has a valve malfunction or the coil water temperature is not supplied at the design condition.

The above-described summary, features, and advantages of the present disclosure thus improve upon aspects of those systems and methods in the prior art designed to control the temperature of a space.

DRAWINGS REFERENCE NUMERALS

100 Fan Coil Unit(FCU)/CRAC Optimizer System
102 Computer Room Air-Conditioning Unit (CRAC)
104 Supply Air Temperature (SAT) Sensor
106 Variable Frequency Drive VFD
108 On/Off Switch
110 Fan Motor
112 Fan
114 Control Valve
116 Room Temperature Sensor
200 FCU/CRAC Optimizer System Control Sequence
202 SET Time (TM)=0
204 SET minimum (Min) speed
206 Time (TM)>10 Minutes
208 SAT>90° F.
210 Direct PID (proportional-integral-derivative) Control Loop
212 SAT<78° F.
214 SET Time (TM)=0 If TM STOPS
216 58° F.<SAT<68° F., TM>10 min
218 Set Fan Speed=80%, TM STOPS
220 REVERSE PID CONTROL LOOP
222 SAT<78° F.>72° F. or SAT<56° F.

BRIEF DESCRIPTION OF THE DRAWINGS

It will be appreciated that for simplicity and clarity of illustration, elements illustrated in the following figures have not necessarily been drawn to scale. For example, the dimensions of some of the elements are exaggerated relative to other elements for clarity. Advantages, features and characteristics of the present disclosure, as well as methods, operation and functions of related elements of structure, and the combination of parts and economies of manufacture, will become apparent upon consideration of the following description and claims with reference to the accompanying drawings, all of which form a part of the specification, wherein like reference numerals designate corresponding parts in the various figures, and wherein:

DETAILED DESCRIPTION

Before the present methods, systems, and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope.

It must also be noted that as used herein and in the appended claims, the singular forms "a", "an," and "the" include plural references unless the context clearly dictates otherwise. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. Nothing herein is to be construed as an admission that the embodiments described herein are not entitled to antedate such disclosure by virtue of prior invention.

Figure 1:
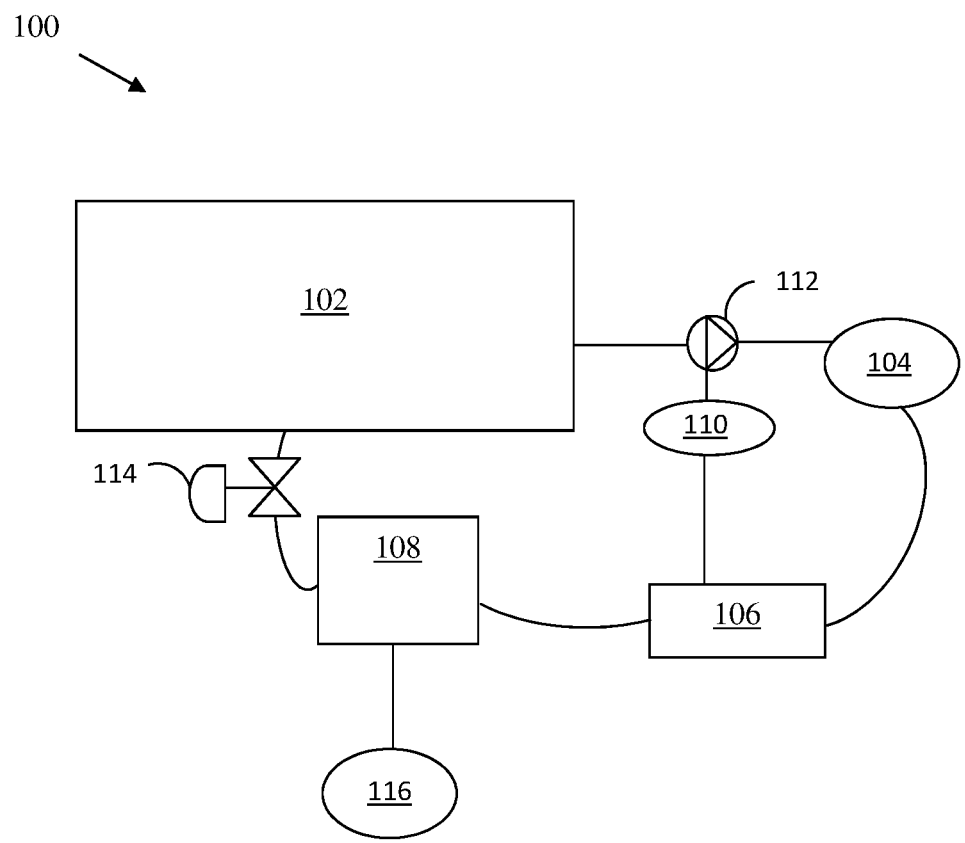
FIG. 1 is a schematic diagram of the system embodying the principles of the invention used for optimizing CRAC (computer room air-conditioning) units and FCU (fan coil units).

Fan coil unit/CRAC optimizer system 100 is illustrated in FIG. 1. Optimizer system 100 can be implemented with a fan coil unit or a computer room air-conditioning (CRAC) unit. In the embodiment illustrated in FIG. 1, 102 is a CRAC unit. However, in an alternative embodiment, 102 can be a fan coil unit. The embodiment in FIG. 1 illustrates fan coil unit/CRAC optimizer system 100 as comprised of computer room air-conditioning (CRAC) unit 102, on/off switch 108, variable frequency drive 106, fan motor 110, fan 112, and supply air temperature sensor 104. In the embodiment described in FIG. 1, CRAC unit 102 is connected in communication with on/off switch 108. Room temperature sensor 116 is connected in communication to on/off switch 108 and configured to modulate control valve 114. Variable frequency drive 106 is connected in communication with fan motor 110 and supply air temperature sensor 104 and configured to modulate the supply air temperature. Fan motor 110 is connected in communication with and configured to control fan 112.

Figure 2:
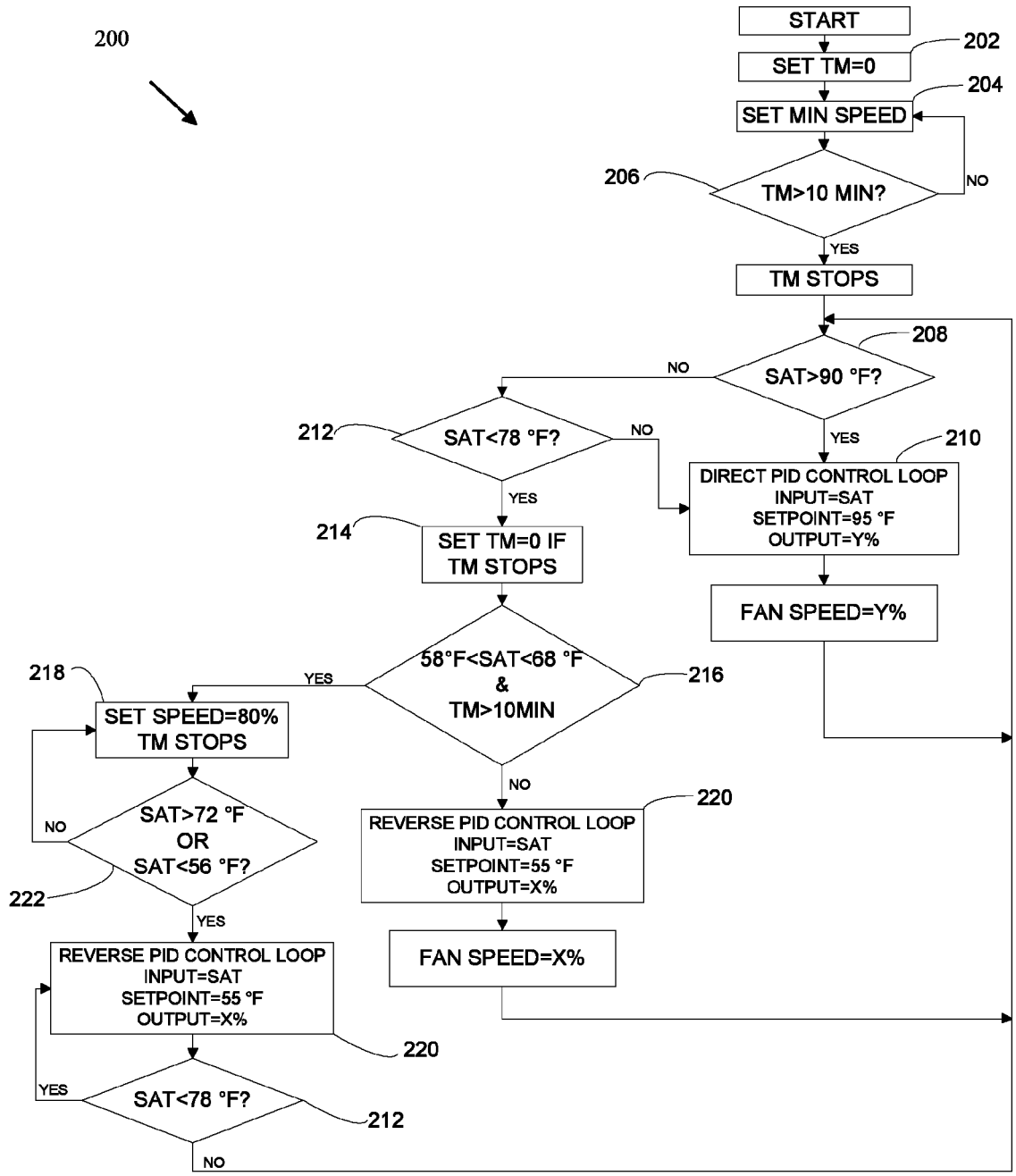
FIG. 2 is a flow chart of the control sequence of the system embodying the principles of the invention used for optimizing CRAC (computer room air-conditioning) units and FCU (fan coil units).

FIG. 2 illustrates the control sequence of fan coil unit/CRAC optimizer system 100. The control sequence differs depending on the embodiment, that is, it differs depending on whether 102 is a fan coil unit or a computer room air-conditioning unit. This difference is explained in paragraph 0020. The fan coil unit/CRAC optimizer system control sequence 200 is shown in the flow chart illustrated in FIG. 2.

Fan coil unit/CRAC optimizer system control sequence 200 is described in more detail in the following. Based on the flow chart shown in FIG. 2, the control sequence is initiated when the time is set at 0 (step 202) and fan motor 110 is set at a preset minimum (adjustable, between 20%-50%) speed (step 204). In the embodiment in which fan coil unit/CRAC optimizer system 100 has CRAC unit 102 as illustrated in FIG. 1, it is recommended to set the minimum speed at 50%. However, in the embodiment in which fan coil unit/CRAC optimizer system 100 instead has a fan coil unit, it is recommended to set the minimum speed at 30%. In both possible embodiments, the fan speed should be set high enough to ensure adequate airflow to the units.

If the time is greater than 10 minutes (step 206) and the supply air temperature is higher than 90° F. (step 208), the speed of fan motor 110 is modulated to maintain the supply air temperature at 95° F. (step 210). If the time is greater than 10 minutes (step 206) and the supply air temperature is lower than 78° F. (step 212) then the time clock is reset to zero (step 214). If the conditions that the supply air temperature be greater than 58° F. yet not exceed 68° F. (adjustable) and the time be greater than 10 minutes (step 216) are not satisfied, then the speed of fan motor 110 is modulated to maintain the temperature at 55° F. through a reverse proportional-integral-derivative (PID) Loop (step 220).

If the supply air temperature exceeds 55° F., the speed of fan motor 110 is slowed. If, however, the supply air temperature is less than 78° F. (step 212), time set to 0 (step 214), the conditions are satisfied that the supply air temperature is greater than 58° F. but less than 68° F. and fan motor 110 is at a minimum speed for more than 10 minutes (this time is adjustable between approximately 8-15 minutes) (step 216), then the speed of fan motor 110 is set at 80% (step 218). If the supply air temperature exceeds 72° F. (adjustable, as long as it is greater than the temperature in step 216) (step 222) or lower than 56° F., the fixed fan speed control is released to normal and the fan speed is modulated to maintain the temperature at 55° F. (step 220).

In the case that the supply air temperature exceeds 78° F. (this temperature is adjustable, but it should be greater than the temperature in step 222 and not exceed that in step 208) (step 212), the speed of fan motor 110 is modulated to maintain the supply air temperature at 95° F. through the PI Loop (step 210).

If the air temperature is lower than 95° F., the speed of fan motor 110 is slowed, while if the temperature exceeds 95° F., the speed is increased (step 210).

It will be apparent to those skilled in the art that various modifications can be made in the system for optimizing fan coil units/CRAC unit without departing from the scope or spirit of the given embodiment. Other embodiments will be apparent to those skilled in the art from consideration of the specification and practice of the disclosure in this application.

What is claimed is:

1. A method of modulating a speed of a fan motor of a cooling unit to maintain a supply air temperature value at a predetermined setpoint, said method comprising:
    providing a supply air temperature sensor, said supply air temperature sensor operable to measure said supply air temperature value;
    providing a variable frequency drive having a timer for counting a period of time in signal communication with said fan motor and said supply air temperature sensor, said variable frequency drive operable to collect said supply air temperature value from said supply air temperature sensor;
    modulating, by said variable frequency drive, said speed of said fan motor to maintain said supply air temperature value at a predetermined setpoint of 95° F. using direct proportional-integral-derivative (PID) control when said period of time exceeds 10 minutes and said supply air temperature value is greater than 90° F.;
    resetting, by said timer, said period of time to 0 when said supply air temperature value is less than 78° F. and said period of time exceeds 10 minutes;
    modulating, by said variable frequency drive, said speed of said fan motor to maintain said supply air temperature value at a predetermined setpoint of 55° F. using reverse PID control when said supply air temperature value is lower than approximately 58° F. or is greater than approximately 68° F. or said period of time has not yet exceeded 10 minutes;
    modulating, by said variable frequency drive, said speed of said fan motor at 80% of a maximum fan motor speed when said supply air temperature value is greater than 58° F. but less than 68° F., and said period of time at which said fan motor has been operating at a minimum speed equal to or greater than 10 minutes;
    modulating, by said variable frequency drive, said speed of said fan motor to maintain said supply air temperature value at said predetermined setpoint of 55° F. using reverse PID control when said speed of said fan motor is at 80% of said maximum fan motor speed and said supply air temperature value is less than 56° F.;
    modulating, by said variable frequency drive, said speed of said fan motor to maintain said supply air temperature value at said predetermined setpoint of 95° F. using direct PID control when said supply air temperature value exceeds 78° F.

* * * * *